UNITED STATES PATENT OFFICE.

GEORG F. MEYER, OF BRUNSWICK, ASSIGNOR TO RUDOLPH HARTWIG, OF AROLSEN, GERMANY.

METHOD OF FILTRATION.

SPECIFICATION forming part of Letters Patent No. 247,388, dated September 20, 1881.

Application filed September 9, 1880. (No model.) Patented in Germany January 13, 1878, and February 13, 1880, and in Austria-Hungary October 25, 1879.

*To all whom it may concern:*

Be it known that I, GEORG FRIEDRICH MEYER, doctor of philosophy, resident in Brunswick, Germany, have invented a new and useful Improvement in the Method of Filtration as Applied in the Manufacture and in the Refining of Sugar, (for which I have obtained patents in Germany on the 13th of January, 1878, and 13th February, 1880, and in Austria-Hungary on the 25th October, 1879,) of which the following is a specification.

In the manufacture of sugar out of cane or beet-roots, as well as in the refining of raw sugar, the saccharine juice or the solution of sugar has hitherto always been filtered by means of bone-charcoal for the purpose of purifying it of saccharate of lime, organic salts, coloring-matter, and other foreign compounds which have remained in the liquor after its previous treatment by lime, &c. Bone-charcoal is universally used for this purpose, because it is the prevalent opinion that the saccharine liquor has not only to be purified mechanically by the filtration, but that the filtering substances have to act chemically on the same, if white loaf-sugar of good quality and in satisfactory quantity is to be obtained.

According to experiments which I have made, other and far cheaper materials may, however, be substituted for the bone-charcoal without impairing the quality or reducing the quantity of the sugar to be produced. As materials suitable for the said purpose may be named the following: coarse sand or fine gravel, quartz, silicate rocks insoluble in water, mineral coal, (including anthracite,) cokes, peat-charcoal, minerals whose base consists of alkaline earths and which are practically insoluble in water—as, for instance, heavy spar, (sulphate of baryta,) limestone, dolomite, &c.; moreover, broken porcelain, crockery, and thoroughly-burnt potter's-ware, stock-bricks, and other insoluble artificial silicates, and, finally, slag-hair. Such of these substances as originally occur in lumps or large pieces have to be reduced in a suitable manner, and thereupon to be sifted, (the latter process being also ordinarily required with regard to the gravel or sand,) so that a granular mass is obtained the particles of which are, by preference, not smaller than a millet-grain and not larger than a pea. The material, after having been washed, is brought into the filtering-vessels in the same manner as hitherto practiced with regard to the bone-charcoal. When, after a certain time, the liquor passing through the filter begins to appear turbid, the filter is emptied and the gravel, &c., are brought into reservoirs plastered with cement, or into other suitable vessels, whereupon it is washed, at first with diluted muriatic acid and subsequently with pure water, which has to be renewed several times. The material may thereupon be used again.

The advantages which the use of the said filtering materials instead of bone-charcoal presents are the following: First, these materials are far cheaper; secondly, the cleansing process to which they have to be submitted from time to time is far less expensive than the revivification of the bone-charcoal; thirdly, the quantity of water remaining in the non-porous materials after having been washed is less than the amount which the bone-charcoal absorbs on account of its porosity when steam is passed through the filters before they are filled with liquor—the latter therefore becomes less diluted; fourthly, the non-porous materials retain less saccharine liquor at the end of the filtering process, and this remaining quantity may be washed out even more completely with a smaller quantity of water, so that on this account, also, less water (which has to be evaporated again) enters into the liquor. The saving resulting from these causes—principally, however, from the first and second—amounts to above four per cent. of the entire manufacturing expenses.

I am aware that it has been proposed to remove particles of extraneous matter mechanically suspended in saccharine liquid by passing the same through beds or layers of mineral substances; but these filters were used only for removing the mechanically-suspended impurities, the liquid after the separation of said impurities being defecated by means of bone-charcoal, in the usual way. My improvement, on the contrary, contemplates the application and use of mineral substances, such as hereinbefore specified, in lieu of and as a substitute for bone-charcoal, for the purpose of filtering and defecating saccharine liquids.

In all cases of which I have knowledge the filtering-beds of mineral substances have been of but slight thickness—say two or three feet—sufficient to retain mechanically-suspended impurities, but entirely incapable of defecating the liquid. Under my improvement the filtering is of great depth—say from fourteen to twenty feet deep—for producing white loaf-sugar of good quality, and it has the functions and performs the office of the bone-charcoal filter in effecting the defecation of the saccharine liquid.

In some cases, also, sand or other mineral substance has been mixed in small quantity with bituminous schistus; but in this case the sand was not the defecating agent, but was used simply to allow the liquid to percolate the mass more freely in case finely-powdered schistus were used.

I claim none of the above things; nor do I claim the use of the hereinbefore-specified classes of mineral substances for filtering purposes generally. It is in their application and use as a substitute for bone-charcoal for defecating and refining saccharine liquor by filtration that my improvement is comprised.

What I claim, therefore, and desire to secure by Letters Patent, is—

The improvement in the art of purifying and refining saccharine liquor in the manufacture of sugar, which consists in filtering the same for the purpose of defecating it through the hereinbefore-specified mineral substances, instead of through bone-charcoal, as heretofore, substantially as set forth.

In testimony whereof I have signed my name to this specification in the presence of two subscribing witnesses.

DR. GEORG FRIEDR. MEYER.

Witnesses:
　WILLIAMS C. FOX,
　JOHS. KRACKE.